Figure 1:
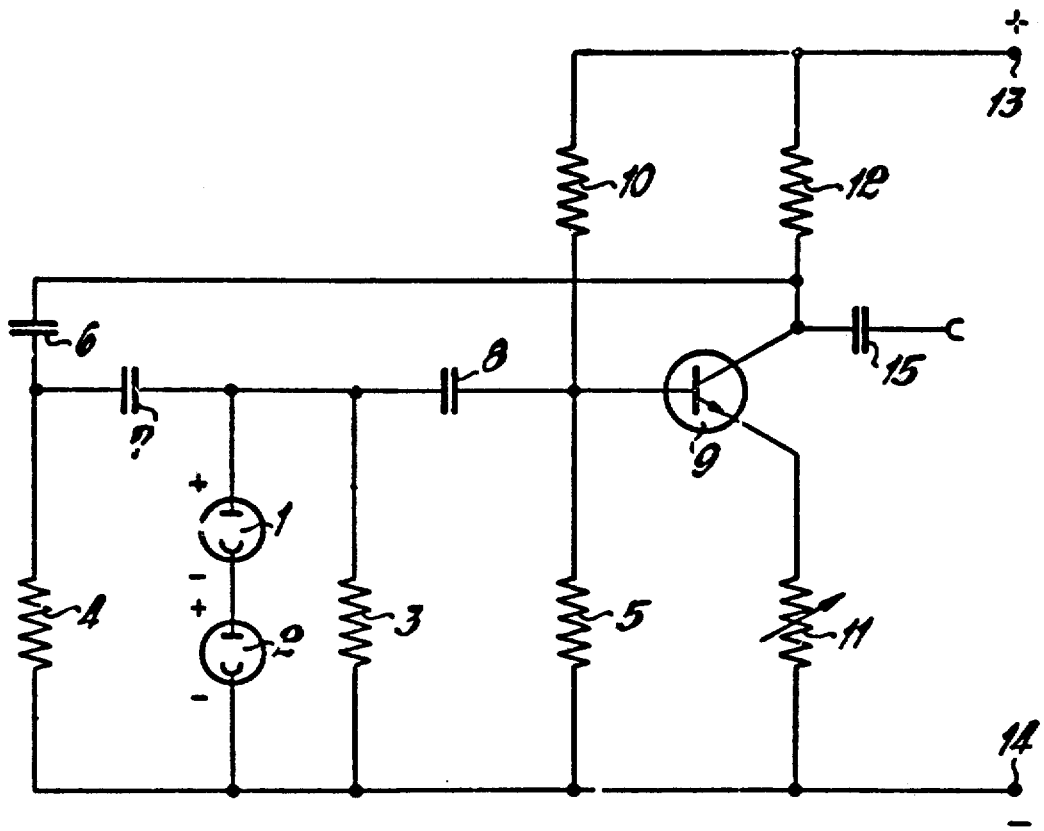

United States Patent
Gith

[11] 3,900,730
[45] Aug. 19, 1975

[54] DEVICE FOR PHOTOELECTRICALLY MONITORING DYNAMIC PROCESSES

[75] Inventor: Walter Gith, Monchengladbach, Germany

[73] Assignee: Schlafhorst & Co., Monchengladbach, Germany

[22] Filed: Oct. 9, 1973

[21] Appl. No.: 404,760

Related U.S. Application Data

[63] Continuation of Ser. No. 124,177, March 15, 1971, abandoned.

[52] U.S. Cl. .................. 250/206; 250/559; 331/66; 330/59
[51] Int. Cl. ............................................. H01j 39/12
[58] Field of Search........ 250/206, 208, 209, 214 R, 250/559; 331/66; 356/159, 160, 238; 330/26, 59

[56] References Cited
UNITED STATES PATENTS

| | | | |
|---|---|---|---|
| 3,076,897 | 2/1963 | Skirvixj | 250/209 |
| 3,389,341 | 6/1968 | Thomas | 250/208 X |
| 3,424,908 | 1/1969 | Sitter | 250/211 X |
| 3,569,717 | 3/1971 | Awojobi et al. | 250/209 |
| 3,576,452 | 4/1971 | Smith | 307/311 |

*Primary Examiner*—Walter Stolwein
*Attorney, Agent, or Firm*—Arthur E. Wilfond

[57] ABSTRACT

Method of photoelectrically monitoring dynamic processes, especially for monitoring at least one thread in textile machines, with a silicon photoelectric element operating with regard to direct light influence, virtually in short circuit, includes adding to the alternating voltage produced by alternating light influences in the photoelectric element, an additional voltage proportional and equal in phase to the alternating voltage, so as to load-relieve the photoelectric element in the range of the alternating voltage and so that the photoelectric element with regard to the alternating voltage operates virtually at no-load; and device for carrying out the method.

6 Claims, 2 Drawing Figures

DEVICE FOR PHOTOELECTRICALLY MONITORING DYNAMIC PROCESSES

This is a continuation of application Ser. No. 124,177, filed Mar. 15, 1971, now abandoned.

The invention relates to method of photoelectrically monitoring dynamic processes, and device for carrying out the method. More particularly, the device of the invention employs one or more photoelectric elements. Furthermore, the invention is especially suited for monitoring at least one thread in textile machines, for example, for monitoring the presence of the thread, the thread thickness, the orderly or correct formation of thread connections or knots, and the like.

It has been known heretofore that for photoelectric elements, for example of silicon, the short-circuit current increases linearly with the light intensity or illumination, while the no-load voltage increases logarithmically with the illumination. This logarithmic voltage increase, which is of great significance in practice, passes into a saturation range, however for a specific light intensity, whereby the logarithmic increase is adulterated. In practice, this means that the saturation range is not utilizable for measuring purposes. If such a photoelectric element is subjected to outside or foreign light, such as direct or indirect solar radiation, for example, in addition to the measuring light, the illumination intensity can readily attain such a value that the saturation range is reached and, consequently, trouble-free monitoring is no longer possible.

In photoelectric monitoring of dynamic processes or operations, especially in the monitoring of one or more threads in textile machines, for example for thread motion regulators, electronic thread cleaners or knot testers, there is used so-called alternating light photoelectric cell equipment, because the dynamic processes produce a continuous alternation of the luminous flux impinging on the photoelectric element. On the other hand, the interfering outside or foreign light, for example sunlight, can be considered as direct light, since it is subjected to slowly occurring deviations only over long time intervals. In order to separate the disturbing direct light influence or interfering direct light from the alternating light influence which is to be used or effective, it is known to connect to the photoelectric element an inductive-capacitive parallel-resonance oscillating circuit, a so-called LC-oscillating circuit, and to tune this oscillating circuit so that it is in resonance with the frequency of the effective alternating light. Consequently, the direct voltage component of the photoelectric element resulting from interfering direct light, is short-circuited by the low ohmic resistance or resistivity of the inductance so that the photoelectric element with respect to the direct light influence is operated virtually in short circuit.

The alternating voltage component of the photoelectric element is loaded however with the resonance resistance of the LC oscillating circuit whose circuit quality Q can be of such dimensions that the resonance resistance becomes very high and thereby constitutes only a very light load for the photoelectric element. Since the photoelectric element thereby only with respect to the alternating voltage component thereof is operated virtually at no-load, the overshooting action of the interfering direct light is rendered harmless. Such a solution for the existing problem has two great disadvantages, however:

1. For dynamic processes with low frequencies, relatively large inductances are required which must be matched and are expensive. Moreover, it is often difficult to make the required space available.

2. If alternating magnetic fields are produced, for example, by the machine to be monitored or by adjacent machines, they cause interfering voltages in the inductance which can be in the order of magnitude of the effective alternating voltage. In order to avoid such magnetic interferences, magnetic shielding is required which necessitates great expense both in terms of equipment and money.

It is accordingly an object of the invention to provide method and device for photoelectrically monitoring dynamic processes wherein outside or foreign light interferences are eliminated and simultaneously the aforementioned disadvantages of using LC oscillating circuits are avoided.

With the foregoing and other objects in view, there is provided in accordance with the invention, method of photoelectrically monitoring dynamic processes, especially for monitoring at least one thread in textile machines, with a silicon photoelectric element operating with regard to direct light influence virtually in short circuit which comprises adding to the alternating voltage produced by alternating light influences in the photoelectric element, an additional voltage proportional and equal in phase to the alternating voltage so as to load-relieve the photoelectric element in the range of the alternating voltage and so that the photoelectric element with regard to the alternating voltage operates virtually at no load.

Thus, whereas in the heretofore known use of an LC oscillating circuit, the alternating voltage of the photoelectric element is connected to a very high alternating current resonance resistance in the effective frequency range and the photoelectric element is thereby subjected to only a slight load by the effective alternating voltage, according to the invention of the instant application, a load-reduction of the photoelectric element is produced in the range of the effective alternating voltage due to the fact that an additional or boosting voltage, which is proportional and equal in phase to the effective alternating voltage is added to the latter, the additional voltage being of such value that the photoelectric element with regard to the alternating voltage is virtually operated at no-load.

Also in accordance with the invention, there is provided device for carrying out the foregoing method of photoelectrically monitoring dynamic processes which includes a photoelectric element to which, as in the heretofore known LC-oscillating circuit, an ohmic resistance or resistivity of such size is connected in parallel that the photoelectric element with respect to the direct current component is virtually short-circuited. In contrast to the heretofore known device having an LC-oscillating circuit, in the device of the instant application, however, the ohmic resistance is part of a bandpass formed of an RC generator operated below the oscillating limit, and which only contains ohmic and capacitive resistances. The pass frequency of the bandpass corresponds substantially to the effective frequency to be monitored.

In accordance with a further feature of the invention, the RC generator is formed of a three-stage RC component, and the photoelectric element is connected parallel to an ohmic resistance located in the middle stage of the three-stage RC component.

In the aforedescribed device, the bandwidth of the alternating voltage produced by the alternating light influences and which is to be amplified is very narrow, however. For measuring dynamic processes as is represented by the monitoring of at least one thread in textile machines, and, in fact, especially the monitoring of the orderly knotting of two threads, it may be desirable to maintain the wide frequency spectrum of the alternating voltages resulting from the dynamic processes, though simultaneously to provide for a relatively high load for the direct voltage component of the photoelectric element, in order to avoid overshooting due to outside or foreign light. This is attained in accordance with another embodiment of the device of the invention, wherein the ohmic resistance connected in parallel with the photoelectric element is part of a wide band alternating voltage amplifier having a positive feedback that is always smaller than the negative feedback thereof which determined the amplification factor.

In accordance with an added feature of the invention, the wide-band alternating voltage amplifier is formed of an amplifying member connected through a capacitance and a leakage resistance to load resistance. The amplifying member is made up of one or more transistors, for example.

In accordance with an additional feature of the invention, the amplifying member is formed of an operation amplifier, as is usually employed in arithmetic or calculating operations, the positive feedback thereof, which deattenuates the ohmic resistance, being always smaller than the negative feedback thereof, which determines the amplification factor.

Other features which are considered as characteristic for the invention are set forth in the appended claims.

Although the invention is illustrated and described herein as method and device for photoelectrically monitoring dynamic processes, it is nevertheless not intended to be limited to the details shown, since various modifications may be made therein without departing from the spirit of the invention and within the scope and range of equivalents of the claims.

Figure 2:
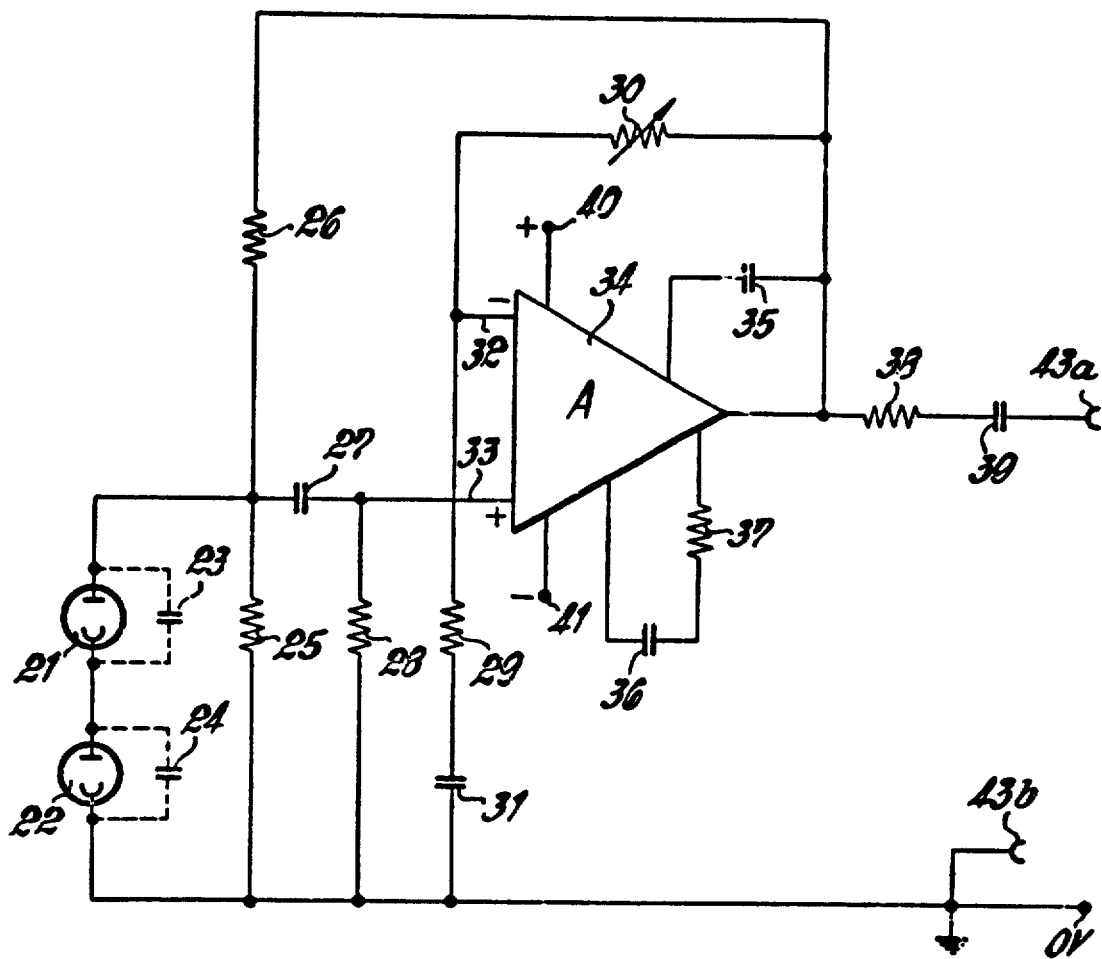

The invention, however, together with additional objects and advantages thereof will be best understood from the following description when read in connection with the accompanying drawing, in which:

FIGS. 1 and 2 are circuit diagrams of different embodiments of the device for photoelectrically monitoring dynamic processes in accordance with the invention.

Referring now to the drawings, and first particularly to FIG. 1 thereof, there is shown therein two serially connected silicon photoelectric elements 1 and 2 with which an ohmic resistance or resistivity 3 is connected in parallel. The resistance 3 is of such value that the photoelectric elements 1 and 2 with respect to the direct current component are virtually short-circuited. This ohmic resistance 3 is part of a bandpass formed of an RC generator operated below the oscillation amplitude limit and including additional ohmic resistances 4 and 5 and capacitive reactances 6, 7 and 8 as well as a transistor 9. The capacitive and ohmic resistances are mutually matched so that the natural frequency of the RC generator corresponds substantially to the frequency which is to be filtered out as the useful or effective frequency. If the amplification of the transistor 9 is kept lower than 29 by means of the negative feedback resistance 11, instead of a generator, there is then obtained in a known manner a bandpass with adjustable circuit quality that can be adjusted between one and 28. The desired bandwidth of the bandpass is thereby also automatically determined. The resistance 10 forms together with the resistance 5 a voltage divider which serves in a conventional manner for adjusting the operating point of the transistor 9. The resistance 12 is the operating resistance of the amplifier in the bandpass, and the capacitor 15 serves for coupling the circuit to the next amplifier stage.

When the circuit illustrated in FIG. 1 is supplied with direct current at the points 13 and 14, all the alternating voltage components of the photoelectric elements 1 and 2 located within the passband or range of the bandpass are balanced through the proportional and in-phase additional voltage components of the bandpass at the amplification factor adjusted at the resistance 11. Whereas the photoelectric elements 1 and 2 thus operate virtually at no-load for alternating voltages, the extraneous influences or interferences are short-circuited through the resistance 3 and cannot have any effect on the measurement result.

In addition to pure direct light interferences, alternating light interferences can also occur. Since the frequency spectrum of these alternating light interferences deviates considerably, however, from that of the useful light influences, the bandpass can be so readily adjusted by means of the resistance 11, that the separation between the useful or effective and the interfering voltages can be kept sufficiently large enough. This advantage becomes especially noticeable when monitoring extremely fine threads because, with these fine threads, the effective signal is very small in spite of the double photoelectric element.

Basically, it is also possible to use instead of the illustrated three-stage RC-component, an RC component having a different number of stages. It is equally possible to connect the photoelectric element in parallel with the resistance 4 or the resistance 5 instead of the resistance 3. If, in accordance with the illustrated embodiment of FIG. 1, however, the photoelectric element is connected in parallel with an ohmic resistance 3 located in the middle of a three-stage RC component, an additional advantage is provided for many uses. As is known, when monitoring threads, a jump in voltage occurs when a thread is inserted in the measuring photoelectric cell device. That jump in voltage can exceed the signal voltage which develops during the travel of the thread by almost five times its value. Moreover, when the thread is at rest, it may be buffeted by air currents, for example, from an oscillating fan which produces oscillations in the thread at a frequency which may actually exceed the frequency of the bandpass, but may nevertheless have a damaging effect under certain conditions because of the high amplitude. Due to the symmetrical feed at the resistance 3, these interferences are differentiated and damped to the greatest possible extent.

In FIG. 2, the photoelectric elements 21 and 22 form, together with a non-illustrated optical device and a gallium arsenide diode as infra-red source, a measuring photoelectric cell device. The photosensitive effective area is divided in two photoelectric elements in order to reduce the inner depletion layer capacitance. This is clearly recognizable from the depletion layer capacitances 23 and 24, represented by dotted lines in an equivalent circuit diagram in FIG. 2, which are respectively only half as large for both photoelectric elements than if only one photoelectric element having double the effective surface were used and whose series connection necessarily produces a reduction of the entire depletion layer capacitance to 25 percent. This reduction in the depletion layer capacitance is especially significant because of the reduction of the filter factor for high frequencies, since the gallium arsenide diode is fed with pulsating direct current having a pulse train frequency of, for example, 10 kHz, and accordingly the irradiation of the photoelectric elements with alternating light is in this order of magnitude, the amplitude of this alternating light being modulated by the shadow produced by one or more of the threads.

The low ohmic load resistance or load resistivity 25 is connected parallel to the photoelectric elements 21 and 22. The resistance 25 is of such value that the photoelectric elements 21 and 22 are operated virtually in short-circuit with respect to the influence of the direct light. A capacitance 27 separates the residual direct voltage and is of such dimensions that it has, together with the resistance 28 which is connected to ground, a very small time constant, so that frequencies within the range of the system frequency are not exceeded.

The operational amplifier 34 conventionally known for arithmetic operation and commercially available as a component part, has the function of amplifying as high as possible, the alternating voltages of about 10 kHz produced by the photoelectric elements 21 and 22, while the voltage pulses of the photoelectric elements 21 and 22 originating from relatively slow variations in the foreign or outside light interferences are not to be amplified. The alternating voltage amplification is determined in a conventional manner by the negative feedback resistances 30 and 29 as well as the capacitor 31. By selecting the smallest possible time constant for the resistances 28 and 29 and the capacitors 27 and 31, the direct voltage components and low frequencies are suppressed so that the voltage division in the negative feedback channel becomes so advantageous that no amplification occurs in the foregoing transmission range.

In order to attain the desired damping reduction or deattenuation of the load resistance 25, i.e. the apparent increase of the load resistance about an approximate no-load characteristic for alternating voltages down from a low limit frequency, for example 150 Hz, there is employed a positive feedback which should advantageously always be several percent smaller than the aforedescribed negative feedback in order to avoid self-excitation. The load resistance 25 represents together with the resistance 26, the output load resistance of the operational amplifier 34. The divider ratio of both these resistances determines the extent of the positive feedback. Since the operational amplifier 34, as aforementioned, has a high alternating voltage amplification for higher frequencies but no amplification for direct and low alternating voltages, the resistance 25, as desired, is greatly deattenuated or improved for alternating voltages in the effective frequency range. Consequently, an apparent increase of the load resistance results for the effective frequency range of the alternating voltages, whereas for direct voltage, the lower resistance value of the load resistance 25 is maintained.

The capacitors 35 and 36, as well as the resistance 37 are provided for the usual frequency compensation of the operation amplifier and are often built into the operation amplifier beforehand. The resistance 38 represents the usual decoupling resistance with capacitive loading through the capacitance 39. The feeding of the operational amplifier is effected through the terminals 40 and 41 from a constant current source. At the isolation points 43a and 43b, the output alternating voltage signal, which is practically free of any direct voltage components, is taken off. This output signal can be fed, through additional amplifiers, if desired, to a demodulator which separates the amplitude deviations, originating due to the shadow produced by the thread, from the fundamental frequency.

The embodiment of the circuit shown in the figures is capable of being varied in diverse ways. It is essential, in the sense of the invention of this application, however, that the load resistivity or ohmic load resistance 5 connected in parallel with the photoelectric elements 1 and 2 is part of a broad-band alternating voltage amplifier which has an amplification-determining negative feedback and includes a positive feedback deattenuating the ohmic resistance or resistivity and which should, as aforementioned, be always smaller than the negative feedback. A result thereof is that the resistance 5 constitutes a high load for direct voltages, yet only a very low load for alternating voltages, and the disadvantages of inductances, band-pass filters, resonance circuits or the like, need not be taken into consideration. Instead of the operational amplifier 34, for example, any other desired amplifying device, such as a simple transistor, can be used, the output alternating voltage of the transistor being then fed through further amplifying stages. The use of the operational amplifier 34 as amplifying device has the advantage, however, that, in addition to the high stability thereof, it simultaneously renders any further amplifiers superfluous. Nevertheless, it may be advantageous under certain circumstances, to feed the output alternating voltage signal, taken off the isolation points 23a and 23b, to further amplifier stages.

I claim:

1. A device for carrying out a method of photoelectrically monitoring dynamic processes, comprising a silicon photoelectric element, an ohmic resistance connected directly in parallel with said photoelectric element and having a resistivity such that said photoelectric element with respect to a direct current component therein caused by a substantially non-deviating light source is substantially short-circuited thereby, a bandpass connected across said photoelement, said ohmic resistance comprising a part of said bandpass, said bandpass including means for providing an in phase supplementary AC potential across said photoelement, whereby said bandpass comprises an RC generator operating below the amplitude limit of its oscillatory potential.

2. Device according to claim 1 wherein said ohmic resistance is located in the middle of a three-stage RC component.

3. In a device for carrying out a method of photoelectrically monitoring dynamic processes, a silicon photoelectric element producing an AC voltage from alternating light, an ohmic resistance connected in parallel with said photoelectric element, said ohmic resistance forming part of a wide-band alternating voltage amplifier having a positive feedback in phase with said AC voltage, said positive feedback being connected across said ohmic resistance, said amplifier also having a negative feedback means connected to said amplifier for determining the amplification factor, and voltage divider means connected to said amplifier and said ohmic resistance to make said positive feedback always smaller than said negative feedback.

4. Device according to claim 3 wherein said wideband alternating voltage amplifier is formed of an amplifying member connected by a capacitance and a leakage resistance to a load resistance.

5. Device according to claim 4 wherein said amplifying member is a transistor.

6. Device according to claim 3 wherein said wideband alternating voltage amplifier is an operational amplifier.

* * * * *